United States Patent [19]
Yamamoto et al.

[11] Patent Number: 5,657,100
[45] Date of Patent: Aug. 12, 1997

[54] OPTICAL TRANSMITTANCE ADJUSTING DEVICE HAVING A MATRIX OF ELECTRODES EACH CONNECTED TO A PHOTOCONDUCTOR SMALLER THAN THE ELECTRODE

[75] Inventors: Yoshitaka Yamamoto, Yamatokoriyama; Yutaka Ishii, Nara, both of Japan

[73] Assignee: Sharp Kabushiki Kaisha, Osaka, Japan

[21] Appl. No.: 380,249

[22] Filed: Jan. 27, 1995

Related U.S. Application Data

[63] Continuation of Ser. No. 13,037, Feb. 3, 1993, abandoned.

[30] Foreign Application Priority Data

Feb. 3, 1992 [JP] Japan .................. 4-017937
Mar. 11, 1992 [JP] Japan .................. 4-052891

[51] Int. Cl.$^6$ ...................... G02F 1/136; G02F 1/13
[52] U.S. Cl. ............................ 349/41; 349/1
[58] Field of Search ............... 359/72; 349/41, 349/1

[56] References Cited

U.S. PATENT DOCUMENTS

| | | | |
|---|---|---|---|
| 3,758,207 | 9/1973 | Letzer | 355/80 |
| 3,761,172 | 9/1973 | Letzer | 355/3 |
| 4,941,735 | 7/1990 | Moddel et al. | 359/72 |
| 5,056,897 | 10/1991 | Akiyama et al. | 359/72 |
| 5,064,275 | 11/1991 | Tsuroda et al. | 359/72 |
| 5,168,378 | 12/1992 | Black et al. | 359/63 |
| 5,177,628 | 1/1993 | Moddel | 359/72 |
| 5,193,016 | 3/1993 | Cornuejols | 359/53 |
| 5,236,620 | 8/1993 | Reiffenrath et al. | 359/104 |
| 5,535,027 | 7/1996 | Kimura et al. | 359/72 |

FOREIGN PATENT DOCUMENTS

| | | | |
|---|---|---|---|
| 0 390 714 | 10/1990 | European Pat. Off. . | |
| 2 602 883 | 2/1988 | France . | |
| 2 610 735 | 8/1988 | France . | |
| 63-64030 | 3/1988 | Japan | 359/72 |
| 64-13527 | 1/1989 | Japan | 359/72 |
| 2-085825 | 3/1990 | Japan | 359/72 |
| 3-002836 | 1/1991 | Japan | 359/72 |

*Primary Examiner*—Anita Pellman Gross
*Attorney, Agent, or Firm*—David G. Conlin; Milton Oliver

[57] ABSTRACT

An optical transmittance adjusting device which includes an optical transmittance adjusting plane divided into a plurality of areas; and adjusting means for detecting an amount of light incident on each of the areas and adjusting an optical transmittance separately for each of the areas based on the detected amount of light.

14 Claims, 11 Drawing Sheets

OPTICAL TRANSMITTANCE ADJUSTING DEVICE HAVING A MATRIX OF ELECTRODES EACH CONNECTED TO A PHOTOCONDUCTOR SMALLER THAN THE ELECTRODE

This is a continuation of application Ser. No. 08/013,037 filed on Feb. 3, 1993, now abandoned.

BACKGROUND OF THE INVENTION

1. Field of the Invention

The present invention relates to an optical transmittance adjusting device for use in a display apparatus such as a liquid crystal TV, an imaging apparatus such as a video camera, a copying apparatus, and an optical apparatus such as a camera, and in particular to an optical transmittance adjusting device for adjusting a contrast ratio of an image obtained by the above-mentioned apparatuses and partially controlling an amount of light incident on the apparatuses.

2. Description of the Related Art

Conventionally, the contrast ratio of an image is adjusted mainly by the following methods.

(1) Covering an original image with a filter

This method is used in a copying apparatus or the like for copying an image having a half tone area such as a photograph. Usually, the original image is covered with a filter such as a silk screen for decreasing the contrast ratio.

(2) Covering an illuminating lamp with a filter

A surface of a flash lamp or an illuminating lamp is covered with a filter, thereby uniformizing an intensity of the illuminating light for decreasing the contrast ratio of the image.

(3) Using an image processing technology

Using a technology for detecting an edge of an image or other technologies, the contrast ratio of the image is electrically increased or decreased.

Backlight compensation, which is an example of partially adjusting an amount of incident light, will be described in the case of a camera and a video camera.

In a camera, an operator manually pushes a backlight compensation button when judging that backlight is incident. When the button is pushed, exposure is increased to above a level set by an automatic exposure adjusting device, thereby preventing an image of an object to be shot from being darkened.

In an imaging apparatus using a CCD (charge coupled device), such as a video camera, an image read by the CCD is divided into six areas, and data for each area is processed in accordance with a specified priority order for automatic backlight compensation. Practically, when the backlight is incident on an area having a high priority, all the six areas are darkened to adjust an image of an object to be shot; and when the backlight is incident on an area having a low priority, no contrast ratio adjustment is conducted.

As is apparent from the above description, the contrast ratio is conventionally adjusted for an image of an object before the object is shot. For an obtained image, only image processing is performed. The use of an image processing technology requires a high performance computer and data processing software, and a high level of skill for operating the computer and software. Accordingly, it is difficult for laymen to operate the conventional optical transmission adjusting devices.

For backlight compensation in a camera, an operator manually pushes the button when judging that backlight is incident. Accordingly, whether proper compensation is performed or not depends on skill and experience of the operator, which restricts accurate compensation. Further, the compensation can be performed by a uniform extent, but cannot be performed in accordance with the amount of incident light. In backlight compensation in an imaging apparatus such as a video camera, when backlight is incident on an area having a high priority, there is an undesirable possibility that the image is entirely darkened. In contrast, when backlight is incident on an area having a low priority, no contrast ratio adjustment is conducted, thereby making the image too bright in that area. In either case, the quality of the image is low.

SUMMARY OF THE INVENTION

An optical transmittance adjusting device includes an optical transmittance adjusting plane divided into a plurality of areas; and adjusting means for detecting an amount of light incident on each of the areas and adjusting an optical transmittance separately for each of the areas based on the detected amount of light.

Alternatively, an optical transmittance adjusting device includes a liquid crystal; and a first substrate and a second substrate interposing the liquid crystal therebetween. The first substrate includes a first transparent electrode on a surface thereof adjacent to the liquid crystal, and the second substrate includes a transparent photoconductor on a surface thereof adjacent to the liquid crystal and includes a second transparent electrode on another surface thereof. The first electrode and the second electrode are supplied with an AC voltage.

Thus, the invention described herein makes possible the advantages of providing an optical transmittance adjusting device for easily adjusting a contrast ratio of an obtained image and performing backlight compensation.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrating examples with reference to the accompanying drawings.

EXAMPLE 1

Figure 1:
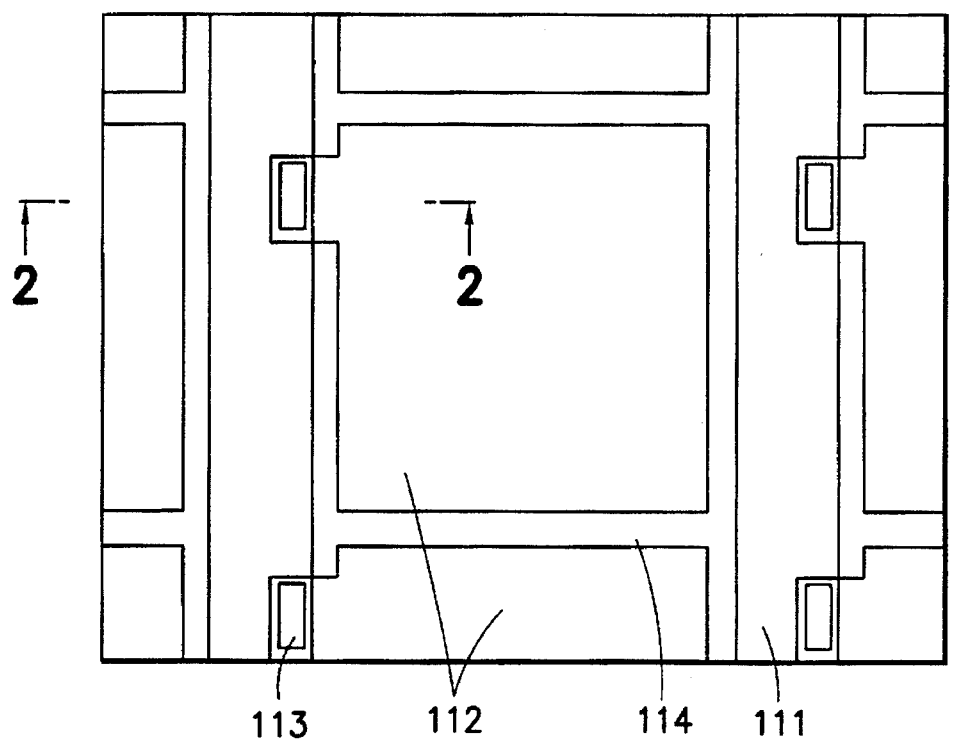
FIG. 1 is a plan view of an optical transmittance adjusting device according to the present invention.
Figure 2:
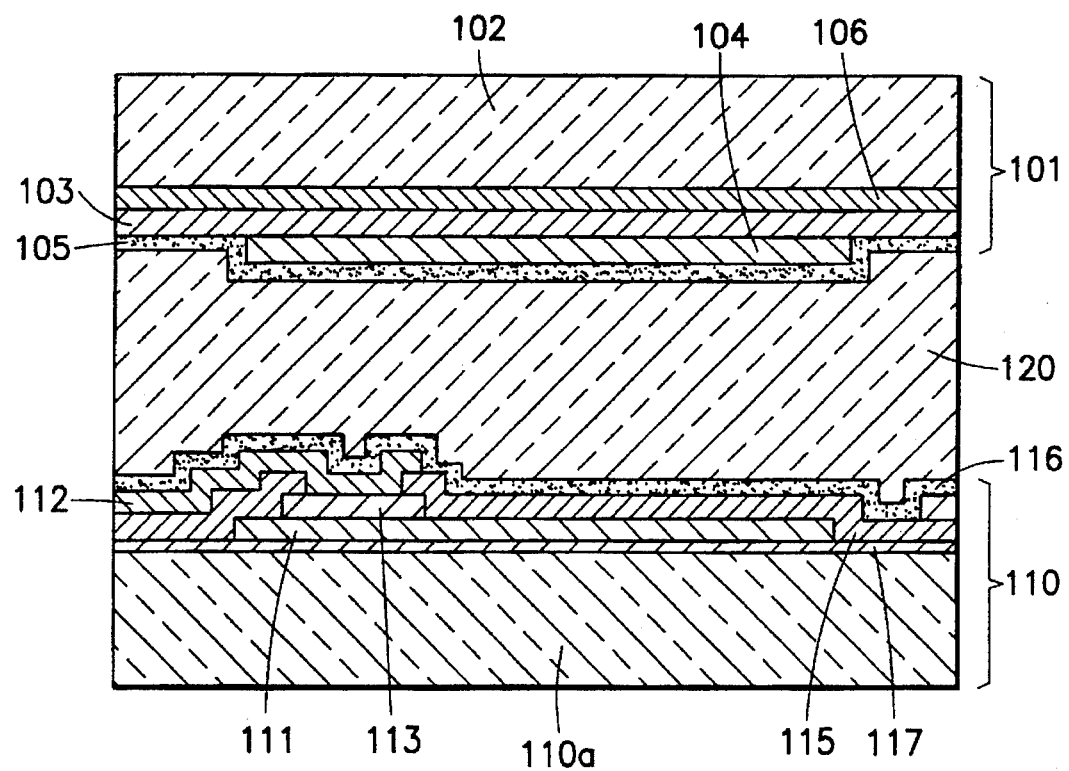
FIG. 2 is a cross sectional view of the optical transmittance adjusting device shown in FIG. 1 along lines A—A'.

FIG. 1 is a plan view of an optical transmittance adjusting device according to a first example of the present invention, and FIG. 2 is a cross sectional view of FIG. 1 along lines A—A'.

The optical transmittance adjusting device includes two substrates 101 and 110 opposed to each other and a liquid crystal 120 interposed therebetween.

The substrate 110 includes a transparent glass panel 110a, a $SiO_2$ thin film 117 provided on an entire surface of the glass panel 110a, a source electrode 111 arranged in a strip provided thereon, pixel electrodes 112 for applying a voltage to the liquid crystal 120, and a photoconductor 113 formed of a photoconductive material and interposed between the source electrode 111 and the pixel electrodes 112. The source electrode 111 is formed of a metal such as Mo, Ta, or Al in order to lower the wiring resistance, and further is formed to have a smallest possible width which secures an acceptable wiring resistance, so that the source electrode 111 does not affect optical transmission. The photoconductor 113 is also formed to be as small as possible in order to obtain a maximum possible area for light transmission. A gap 114 among the pixel electrodes 112 desirably has a minimum width since the width of the gap 114 does not contribute to optical transmission adjustment.

The substrate 101 includes a glass panel 102, a $SiO_2$ thin film 106, a transparent counter electrode 103, a black mask 104, and an alignment film 105 which are laminated in this order.

An insulating film 115 is provided so as to cover the source electrode 111 and the photoconductor 113 in order to insulate between the source electrode 111 and pixel electrodes 112, to prevent the voltage of the source electrode 111 from influencing the liquid crystal 120, and to protect the liquid crystal 120 from contamination by the substrate 110. The insulating film 115 has an opening above the photoconductor 113, through which the pixel electrode 112 and the photoconductor 113 are connected to each other. An alignment film 116 formed of polyimide is provided on an insulating film 115 so as to cover the pixel electrodes 112.

A production method for the optical transmittance adjusting device illustrated in FIGS. 1 and 2 will be explained.

As the glass panel 102, a borosilicate glass panel having a high flatness and a thickness of approximately 1.1 mm was used. On a surface of the glass panel 102, the $SiO_2$ thin film 106 having a thickness of approximately 100 nm was formed in order to prevent alkali elution. After a surface of the $SiO_2$ thin film 106 was cleaned by a specified pretreatment method, transparent ITO (indium thin oxide) was sputtered in a thickness of approximately 120 nm on the surface and an unnecessary portion at a periphery thereof was etched away to form the counter electrode 103. Then, chrome was sputtered in a thickness of approximately 100 nm on a surface of the counter electrode 103 and an unnecessary portion was etched away to form the black mask 104. Then, the surface of the counter electrode 103 having the black mask 104 thereon was coated with the alignment film 105 formed of polyimide, and alignment treatment was performed by rubbing. In this manner, the substrate 101 was obtained.

As the glass panel 110a, a borosilicate glass panel having a high flatness was used. On a surface of the glass panel 110a, the $SiO_2$ thin film 117 having a thickness of approximately 100 nm was formed in order to prevent alkali elution. After a surface of the $SiO_2$ thin film 117 was cleaned by a specified pretreatment method, transparent ITO was sputtered in a thickness of approximately 300 nm on the surface and an unnecessary portion thereof was etched away to form the source electrode 111. Then, an amorphous silicon film was formed in a thickness of approximately 200 nm on a surface of the source electrode 111 by plasma CVD (Chemical vapor deposition) and an unnecessary portion thereof was etched away to form the photoconductor 113. A silicon nitride film was formed in a thickness of approximately 300 nm by plasma CVD on the $SiO_2$ thin film 117 so as to cover the source electrode 111 and the photoconductor 113, and a portion thereof above the photoconductor 113 was etched away to form the insulating film 115. ITO was sputtered in a thickness of approximately 150 nm on a surface of the insulating film 115 so as to cover the photoconductor 113 and an unnecessary portion thereof was etched away to form the pixel electrodes 112. A surface of the obtained lamination was coated with the alignment film 116 formed of polyimide, and alignment treatment was performed by rubbing. In this manner, the substrate 110 was obtained.

The substrate 101, and the substrate 110 having a sealing agent formed at a periphery thereof and spacers scattered over an entire surface thereof were bonded together with highly accurate positioning so that the photoconductor 113 be covered with the black mask 104. Then, the liquid crystal 120 was inserted between the substrates 101 and 110. As the liquid crystal 120, ZLI-4876 produced by E. Merck was used, which is a black guest-host liquid crystal having a positive dielectric anisotropy.

In the optical transmittance device according to the present invention having the above-mentioned construction, photoconductivity is changed when the photoconductor 113 is illuminated with light. By converting the change in the conductivity into a change in optical transmittance, the optical transmittance is adjusted in accordance with the amount of light incident on the photoconductor 113.

Figure 3:
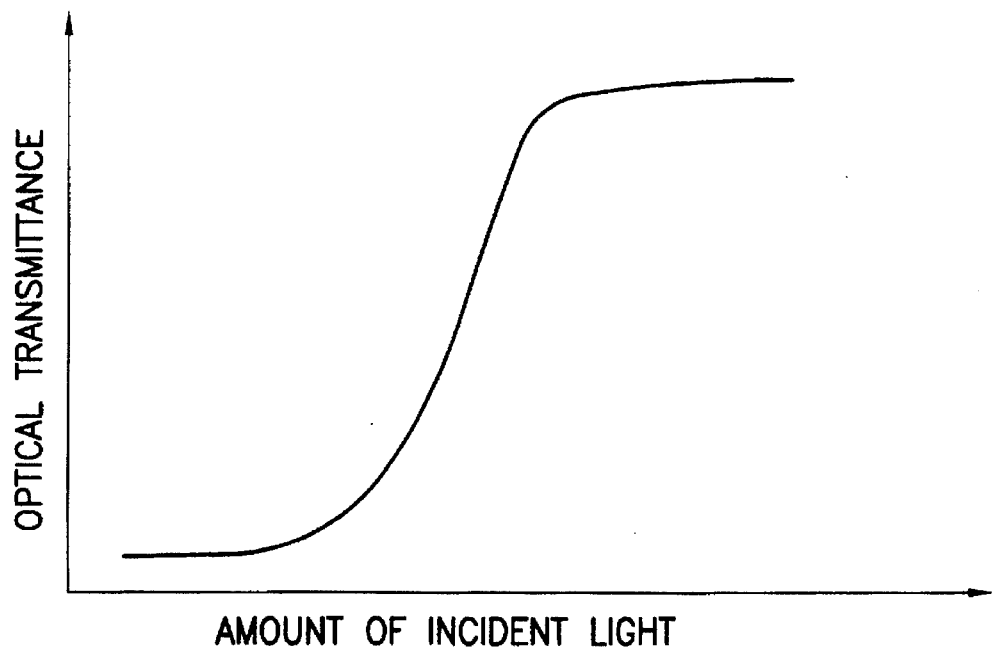
FIG. 3 is a graph illustrating the relationship between the amount of incident light and the optical transmittance in the case when an optical transmittance adjusting device according to the present invention uses a liquid crystal having a positive dielectric anisotropy.

The relationship between the optical transmittance and the amount of incident light was examined with the alignment films 105 and 116 being horizontally aligned and a polarizer being provided on the side of the substrate 110. The result is shown in FIG. 3. With reference to FIG. 3, a practical operation of the optical transmittance adjusting device will be described.

In the case when the amount of light incident on the optical transmittance adjusting device is very small, the resistance of the photoconductor 113 is kept high. Accordingly, substantially no voltage is applied to the liquid crystal 120. Since the liquid crystal 120 has a positive dielectric anisotropy, the optical transmittance is low at this time. As the amount of the incident light is increased, the level of the voltage applied to the liquid crystal 120 is also increased, and thus the alignment of the liquid crystal is changed. Due to the positive dielectric anisotropy of the liquid crystal 120, the optical transmittance is increased in accordance with the change in the alignment. As is apparent from the above description, the optical transmittance is high where the amount of the incident light is large. In contrast, the optical transmittance is low where the amount of the incident light is small. As a result, a black area of an obtained image becomes darker, to increase a contrast ratio of the image.

The sensitivity for transmittance adjustment can be controlled by changing the level of the voltage applied to the counter electrode 103 and the pixel electrode 112 on the substrate 110.

As the liquid crystal 120, any other liquid crystal material than the black guest-host liquid crystal having a positive dielectric anisotropy used in the first example may be used as far as the liquid crystal material controls optical transmittance. The usable liquid crystal materials include guest-host liquid crystals having other coloring agents mixed therein, White Taylor guest-host liquid crystals, twisted nematic liquid crystals, ferroelectric liquid crystals, and polymer-dispersed liquid crystals.

The photoconductor 113 may be formed of any of other materials, than amorphous silicon, which are photoconductive to light having a certain wavelength range. Examples will be listed below.

CdS, Se, GaAs, CdSe or the like may be used for visible light, and InGaAs, PbS, InSb, HgCdTe, PbTe, PbSe or the like may be used for infrared rays. When PbSnTe, InGaAs, HgCdTe, or the like is used, spectral sensitivity can be changed in accordance with the composition.

Although the photoconductor 113 is formed by plasma CVD in the first example, other deposition methods or the like may also be used. The photoconductor 113 may also be formed by adhering a plate-shaped or strip-shaped body formed of photoconductive crystals to the substrate by an adhering method.

EXAMPLE 2

An optical transmittance adjusting device according to a second example of the present invention uses a liquid crystal having a negative dielectric anisotropy interposed between substrates treated with vertical alignment, thereby lowering the contrast ratio of an obtained image. Except for this point, the optical transmittance adjusting device according to the second example has an identical construction with that of the first example. For elements corresponding to those in the first example, corresponding reference numerals will be used, and a description of the construction will be omitted.

A production method for the optical transmittance adjusting device according to the second example will be explained.

As a glass panel 102, a borosilicate glass panel having a high flatness and a thickness of approximately 1.1 mm was used. On a surface of the glass panel 102, a $SiO_2$ thin film 106 having a thickness of approximately 100 nm was formed in order to prevent alkali elution. After a surface of the $SiO_2$ thin film 106 was cleaned by a specified pretreatment method, transparent ITO was sputtered in a thickness of approximately 120 nm on the surface and an unnecessary portion at a periphery thereof was etched away to form a counter electrode 103. Then, chrome was sputtered in a thickness of approximately 100 nm on a surface of the counter electrode 103 and an unnecessary portion was etched away to form a black mask 104. The alignment film 105 for vertical alignment was formed by coating a surface of the obtained lamination with polyimide followed by rubbing, and then coating the obtained surface with an organic silane coupling material for vertical alignment. Alternatively, the alignment film 105 may be formed by coating the obtained lamination with a vertical-aligning film of polyimide followed by light rubbing. In this manner, a substrate 101 was obtained.

As a glass panel 110a, a borosilicate glass panel having a high flatness was used. On a surface of the glass panel 110a, a $SiO_2$ thin film 117 having a thickness of approximately 100 nm was formed in order to prevent alkali elution. After a surface of the $SiO_2$ thin film 117 was cleaned by a specified pretreatment method, transparent ITO was sputtered in a thickness of approximately 300 nm on the surface and an unnecessary portion thereof was etched away to form a source electrode 111. Then, an amorphous silicon film was formed in a thickness of approximately 200 nm on a surface of the source electrode 111 by plasma CVD and an unnecessary portion thereof was etched away to form a photoconductor 113. A silicon nitride film was formed in a thickness of approximately 300 nm by plasma CVD on the $SiO_2$ thin film 117 so as to cover the source electrode 111 and the photoconductor 113, and a portion thereof above the photoconductor 113 was etched away to form an insulating film 115. ITO was sputtered in a thickness of approximately 150 nm on a surface of the insulating film 115 so as to cover the photoconductor 113 and an unnecessary portion thereof was etched away to form pixel electrodes 112. The alignment film 116 for vertical alignment was formed by coating a surface of the obtained lamination with polyimide followed by rubbing, and then coating the obtained surface with an organic silane coupling material for vertical alignment. Alternatively, the alignment film 116 may be formed by coating the obtained lamination with a vertical-aligning film of polyimide followed by light rubbing. In this manner, a substrate 110 was obtained.

The substrate 101, and the substrate 110 having a sealing agent formed at a periphery thereof and spacers scattered over an entire surface thereof were bonded together with highly accurate positioning so that the photoconductor 113 be covered with the black mask 104. Then, the liquid crystal 120 was inserted between the substrates 101 and 110. As the liquid crystal 120, ZLI-4614 produced by E. Merck was used, which is a black guest-host liquid crystal having a negative dielectric anisotropy.

Figure 4:
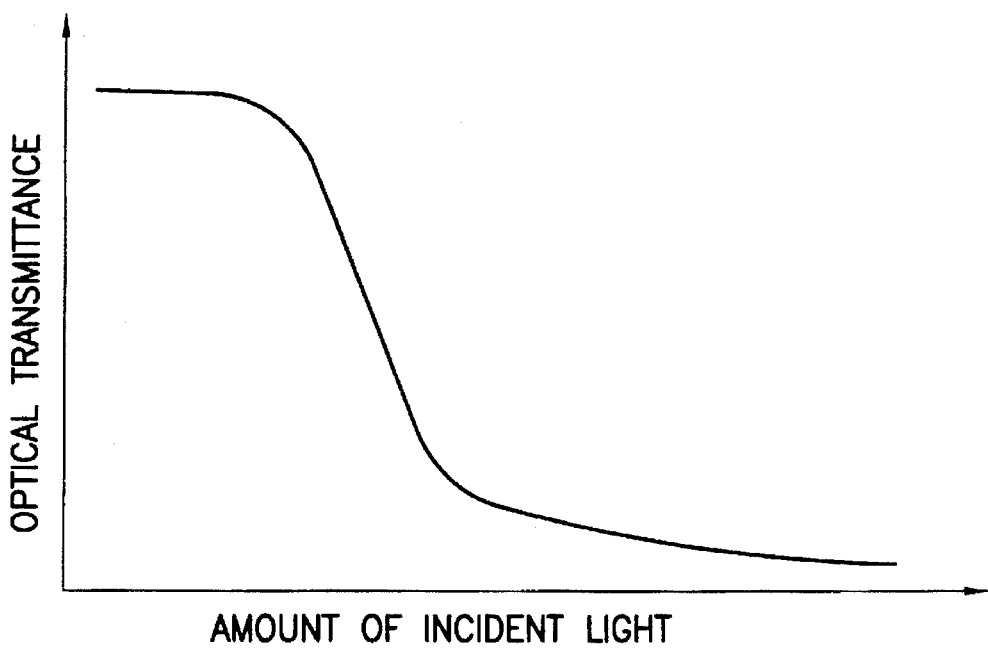
FIG. 4 is a graph illustrating the relationship between the amount of incident light and the optical transmittance in the case when an optical transmittance adjusting device according to the present invention uses a liquid crystal having a negative dielectric anisotropy.

The relationship between the optical transmittance and the amount of incident light was examined with a polarizer being provided on the side of the substrate 110. The result is shown in FIG. 4. With reference to FIG. 4, a practical operation of the optical transmittance adjusting device will be described.

In the case when the amount of light incident on the optical transmittance adjusting device is very small, the resistance of the photoconductor 113 is kept high. Accordingly, substantially no voltage is applied to the liquid crystal 120. Since the liquid crystal 120 has a negative dielectric anisotropy, the optical transmittance is high at this time. As the amount of the incident light is increased, the level of the voltage applied to the liquid crystal 120 is also increased, and thus the alignment of the liquid crystal is changed. Due to the negative dielectric anisotropy of the liquid crystal 120, the optical transmittance is decreased in accordance with the change in the alignment. As is apparent from the above description, the optical transmittance is high where the amount of the incident light is small. The optical transmittance is low where the amount of the incident light is large. As a result, the contrast ratio of an obtained image is lowered.

The photoconductor 113 may be formed of any of other materials, than amorphous silicon, which are photoconductive to light having a certain wavelength range. Examples will be listed below.

CdS, Se, GaAs, CdSe or the like may be used for visible light, and InGaAs, PbS, InSb, HgCdTe, PbSe, PbTe, or the like may be used for infrared rays. When PbSnTe, InGaAs, HgCdTe, or the like is used, spectral sensitivity can be changed in accordance with the composition.

Although the photoconductor 113 is formed by plasma CVD in the first example, other deposition methods or the like may also be used. The photoconductor 113 may also be formed by adhering a plate-shaped or strip-shaped body formed of photoconductive crystals to the substrate by an adhering method.

According to the first and the second examples, the optical transmittance adjusting device can raise the contrast ratio of an image having a low contrast ratio, and further, backlight can be compensated for in the simple manner of partially adjusting the amount of incident light.

EXAMPLE 3

Figure 5:
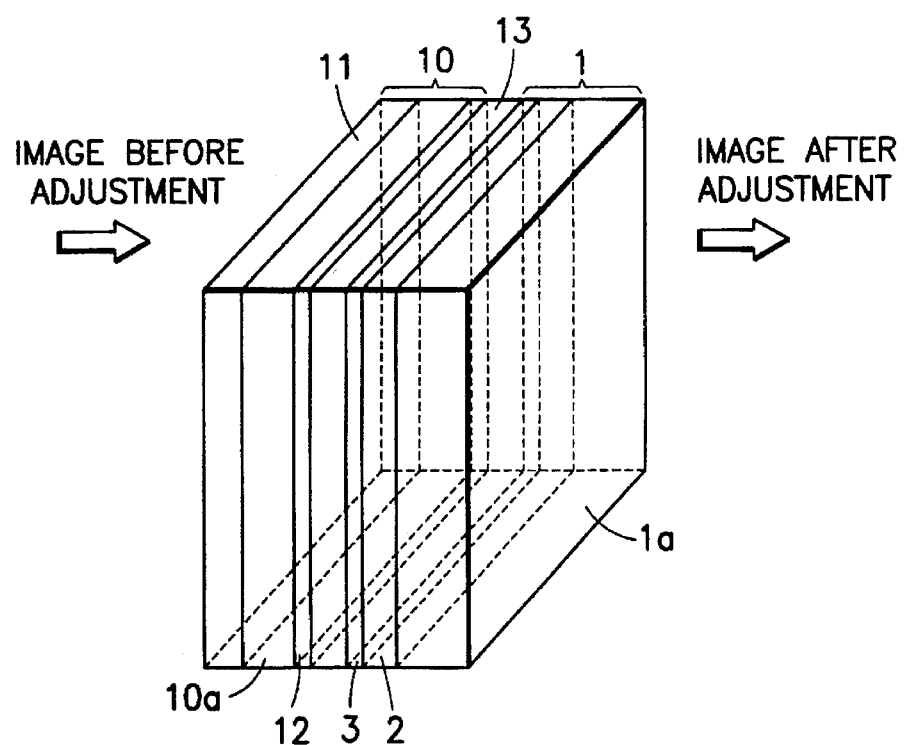
FIG. 5 is a perspective view of another optical transmittance adjusting device according to the present invention.

An optical transmittance adjusting device according to a third example of the present invention is shown in FIG. 5. The optical transmittance adjusting device shown in FIG. 5 includes a guest-host liquid crystal 13 having a positive dielectric anisotropy between substrates 1 and 10 treated with horizontal alignment. By such a construction, the contrast ratio of an obtained image is increased.

The substrate 1 includes a glass panel 1a, a transparent electrode 2 provided on a surface thereof, and an alignment film 3 provided on a surface of the transparent electrode 2. The substrate 10 includes a photoconductor 10a formed of BSO ($Bi_{12}SiO_{20}$) crystals which transmit light, a transparent electrode 11 provided on a surface thereof, and an alignment film 12 provided on the other surface of the photoconductor 10a. The substrates 1 and 10 are opposed to each other with the alignment films 3 and 12 inside, and bonded together with the liquid crystal 13 interposed therebetween. The transparent electrodes 2 and 11, which are provided to apply a voltage to the liquid crystal 13, are supplied with an AC voltage by an AC power source (not shown).

In the optical transmittance adjusting device having the above-mentioned construction, light having data of an image for contrast ratio adjustment is incident on the substrate 10 and comes out from the substrate 1. When light is incident on the substrate 10, the photoconductor 10a converts the amount of the incident light into an electric resistance. The larger the amount of the incident light is, the lower the electric resistance is, and accordingly the higher the level of the voltage applied to the transparent electrodes 2 and 11 is. The liquid crystal 13 is aligned by the voltage. Since the liquid crystal 13 has a positive dielectric anisotropy, the optical transmittance is raised when the level of the voltage is increased.

As is apparent from the above description, the optical transmittance is high where the amount of the incident light is large, and the optical transmittance is low where the amount of the incident light is small. In other words, the incident light is transmitted as it is where the amount of the incident light is large, and the incident light is shielded where the amount of the incident light is small. In an obtained image, the brightness of a white area is kept the same, whereas a black area becomes darker. Thus, the contrast ratio of the images raised.

Since a source electrode is eliminated in the optical transmittance adjusting device according to the third example, the incident light is not shielded by the source electrode. The transparent photoconductor 10a does not shield the incident light, either. The substrates 1 and 10 can entirely have an optical transmittance adjusting function except for a peripheral sealing area, a connection area with an external power source and the like, and an area on which a driving IC is mounted. Further, due to the elimination of pixel electrodes and the equivalent areas, resolution is not restricted by the size of such elements as it is in the first and the second examples. The elimination of the source electrode and the pixel electrodes solves the problems of high cost and low production yield resulting from a step of processing the lamination into a thin film.

A production method for the optical transmittance adjusting device according to the third example will be described.

As the glass panel 1a, a commercially available glass panel having a thickness of approximately 1 mm was used. After the glass panel 1a was washed by a specified pretreatment method, an ITO film was formed in a thickness of approximately 200 nm on a surface of the glass panel 1a by usual vacuum evaporation to form the transparent electrode 2. A surface of the transparent electrode 2 was coated with polyimide by a spin-coat method, dried and polymerized. Then, a rubbing treatment was performed to obtain the alignment film 3.

As the photoconductor 10a, a 0.5 mm thick plate formed of BSO crystals and having both surfaces thereof being mirror-polished was used. After the photoconductor 10a was washed by a specified pretreatment method, an ITO film was formed in a thickness of approximately 200 nm on a surface of the photoconductor 10a by usual vacuum evaporation to form the transparent electrode 11. The other surface of the photoconductor 10a was coated with polyimide by a spin-coat method, dried and polymerized. Then, a rubbing treatment was performed to obtain the alignment film 12.

Over a surface of the alignment film 12, spacers were scattered, and then the surface was coated with a sealing agent on a periphery thereof. Thus, the substrates 1 and 10 were bonded together. A gap between the substrates 1 and 10 can be adjusted by the size of the spacers. In the third example, the gap was approximately 8 µm. Then, the liquid crystal 13 was inserted into the gap between the substrates 1 and 10. As the liquid crystal 13, for example, ZLI-4876 produced by E. Merck was used, which is a black guest-host liquid crystal having a positive dielectric anisotropy.

A polarizer (not shown) was provided on the side of the substrate 10, and light was incident on the substrate 10, in order to measure the optical transmittance. It was confirmed that the optical transmittance is low where the amount of incident light is small, and that the optical transmittance is high where the amount of incident light is large, thereby increasing the contrast ratio of an obtained image.

As the liquid crystal 13, any other liquid crystal material than the black guest-host liquid crystal having a positive anisotropy used in the third example may be used as far as the liquid crystal material controls optical transmittance. The usable liquid crystal materials include guest-host liquid crystals having other coloring agents mixed therein, White Taylor guest-host liquid crystals, twisted nematic liquid crystals, ferroelectric liquid crystals, and polymer-dispersed liquid crystals. In the case when a polymer-dispersed liquid crystal is used, the alignment films can be eliminated.

The photoconductor 10a may also be formed of any of other materials than photoconductive materials having a high transparency. Alternatively, the photoconductor 10a may be formed by covering a surface of a transparent plate of glass or the like with a photoconductive thin film by vacuum evaporation, sputtering, CVD, coating by use of a brush, sublimation, vapor phase coating or the like. The photoconductive thin film may be an amorphous SiC film formed by CVD, a photoconductive polyimide film, a copper phthalocyanine film or the like. As the photoconductive polyimide film, materials described in A. Takimoto, H. Wakemtro, E. Tanaka, M. Watanabe, H. Ogawa, *J. Photopolym. Sci. Technol.* 3 (1990) p. 73 can be used.

Further, photoconductive materials that are not transparent in the form of a thick film but are transparent in the form of a thin film can also be used. Such usable materials include CdS, Se, GaAs, and CdSe usable for visible light, and InGaAs, PbS, InSb, HgCdTe, PbSe, and PbTe, usable for infrared rays. When PbSnTe, InGaAs, HgCdTe, or the like is used, spectral sensitivity can be changed in accordance with the composition.

EXAMPLE 4

An optical transmittance adjusting device according to a fourth example of the present invention uses a liquid crystal having a negative dielectric anisotropy interposed between substrates treated with vertical alignment, thereby lowering the contrast ratio of an obtained image. Except for this point, the optical transmittance adjusting device according to the fourth example has an identical construction with that of the third example. For elements corresponding to those in the third example, corresponding reference numerals will be used.

As is shown in FIG. 5, the optical transmittance adjusting device according to the fourth example includes a liquid crystal 13 interposed between substrates 1 and 10. The substrate 1 includes a glass panel 1a, a transparent electrode 2 provided on a surface thereof, and an alignment film 3 provided on a surface of the transparent electrode 2. The substrate 10 includes a photoconductor 10a formed of BSO crystals which transmit light, a transparent electrode 11 provided on a surface thereof, and an alignment film 12 provided on the other surface of the photoconductor 10a. The substrates 1 and 10 are opposed to each other with the alignment films 3 and 12 inside, and bonded together with the liquid crystal 13 interposed therebetween. The transparent electrodes 2 and 11, which are provided to apply a voltage to the liquid crystal 13, are applied with an AC voltage by an AC power source (not shown).

In the optical transmittance adjusting device having the above-mentioned construction, light having data of an image for contrast ratio adjustment is incident on the substrate 10 and comes out from the substrate 1. When light is incident on the substrate 10, the photoconductor 10a converts the amount of the incident light into an electric resistance. The larger the amount of the incident light is, the lower the electric resistance is, and accordingly the higher the level of the voltage applied to the transparent electrodes 2 and 11 is. The liquid crystal 13 is aligned by the voltage. Since the liquid crystal 13 has a negative dielectric anisotropy, the optical transmittance is lowered when the level of the voltage is increased.

As is apparent from the above description, the optical transmittance is low where the amount of the incident light is large, and the optical transmittance is high where the amount of the incident light is small. In other words, the incident light is transmitted as it is where the amount of the incident light is small, and the incident light is shielded where the amount of the incident light is large. By controlling the extent of the shielding, the contrast ratio of an obtained image can be adjusted. In the case when a large amount of incident light is incident, the darkness of a black area of the image is kept the same, whereas a white area becomes darker. Thus, the contrast ratio of the image is decreased.

A production method for the optical transmittance adjusting device according to the fourth example will be described.

As the glass panel 1a, a commercially available glass panel having a thickness of approximately 1 mm was used. After the glass panel 1a was washed by a specified pretreatment method, an ITO film was formed in a thickness of approximately 200 nm on a surface of the glass panel 1a by usual vacuum evaporation to form the transparent electrode 2. A surface of the transparent electrode 2 was coated with polyimide by a spin-coat method, dried and polymerized. Then, a rubbing treatment was performed to obtain the alignment film 3.

As the photoconductor 10a, a 0.5 mm thick plate formed of BSO crystals and having both surfaces thereof being mirror-polished was used. After the photoconductor 10a was washed by a specified pretreatment method, an ITO film was formed in a thickness of approximately 200 nm on a surface of the photoconductor 10a by usual vacuum evaporation to form the transparent electrode 11. The other surface of the photoconductor 10a was coated with polyimide by a spin-coat method, dried and polymerized. Then, a rubbing treatment was performed to obtain the alignment film 12.

Over a surface of the alignment film 12, spacers were scattered, and then the surface was coated with a sealing agent on a periphery thereof. Thus, the substrates 1 and 10 were bonded together. A gap between the substrates 1 and 10 can be adjusted by the size of the spacers. In the fourth example, the gap was approximately 8 μm. Then, the liquid crystal 13 was inserted into the gap between the substrates 1 and 10. As the liquid crystal 13, for example, ZLI-4614 produced by E. Merck was used, which is a black guest host liquid crystal having a negative dielectric anisotropy.

A polarizer (not shown) was provided on the side of the substrate 10, and light was incident on the substrate 10, in order to measure the optical transmittance. It was confirmed that the amount of the transmitted light is not considerably changed from the amount of the incident light where the amount of incident light is small, but is decreased where the amount of incident light is large, thereby lowering the contrast ratio of an obtained image.

As the liquid crystal 13, any of other liquid crystal materials than the black guest-host liquid crystal having a negative anisotropy used in the fourth example may be used as far as the liquid crystal material controls optical transmittance. The usable liquid crystal materials include guest-host liquid crystals having other coloring agents mixed therein, White Taylor guest-host liquid crystals, twisted nematic liquid crystals, ferroelectric liquid crystals, and polymer-dispersed liquid crystals. In the case when a polymer-dispersed liquid crystal is used, the alignment films can be eliminated.

The photoconductor 10a may also be formed of any of other materials than photoconductive materials having a high transparency. Alternatively, the photoconductor 10a may be formed by covering a surface of a plate of inexpensive glass or the like with a photoconductive thin film by vacuum evaporation, sputtering, CVD, coating by use of a brush, sublimation, vapor phase coating or the like. The photoconductive thin film may be an amorphous SiC film formed by CVD, a photoconductive polyimide film, a copper phthalocyanine film or the like. As the photoconductive polyimide film, materials described in A. Takimoto, H. Wakemoto, E. Tanaka, M. Watanabe, H. Ogawa, *J. Photopolym. Sci. Technol.* 3 (1990) p. 73 can be used.

Further, photoconductive materials that are not transparent in the form of a thick film but is transparent in the form of a thin film can also be used. Such usable materials include CdS, Se, GaAs, and CdSe usable for visible light, and InGaAs, PbS, InSb, HgCdTe, PbSe, and PbTe usable for infrared rays. When PbSnTe, InGaAs, HgCdTe, or the like is used, spectral sensitivity can be changed in accordance with the composition.

Since a source electrode is eliminated in the optical transmittance adjusting device according to the fourth example, the incident light is not shielded by the source electrode. The transparent photoconductor 10a does not shield the incident light, either. The substrates 1 and 10 can entirely have an optical transmittance adjusting function except for a peripheral sealing area, a connection area with an external power source and the like, and an area on which a driving IC is mounted. Further, due to the elimination of pixel electrodes and the equivalent areas, resolution is not restricted by the size of such elements as it is in the first and the second examples. The elimination of the source electrode and the pixel electrodes solves the problems of high cost and low production yield resulting from a step of processing the lamination into a thin film.

According to an optical transmittance adjusting device according to the present invention, optical transmittance can be controlled by adjusting the level of the voltage applied to electrodes. Such a construction results in an easy conversion of an image data into binary codes. Due to this feature, the optical transmittance adjusting device according to the present invention can be utilized in an image processing apparatus and the like.

Applications

Practical examples of an optical transmittance adjusting device which includes a liquid crystal having a positive dielectric anisotropy will be described.

(Direct-view type liquid crystal display apparatus)

Figure 6:
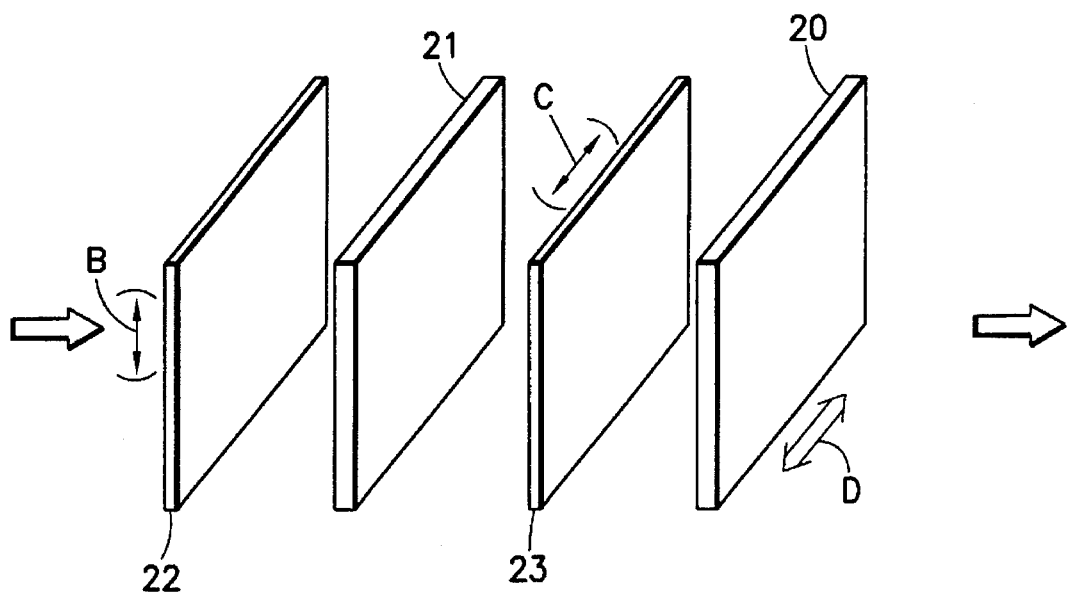
FIG. 6 is a conceptual view of an example of the optical transmittance adjusting device according to the present invention combined with a direct-view type liquid crystal display apparatus.

In a direct-view type liquid crystal display apparatus, a whitish image is often obtained when the contrast ratio is low. FIG. 6 conceptually shows an optical transmittance adjusting device 20 according to the present invention combined with a 1/50-duty simple matrix liquid crystal display apparatus 21. With reference to FIG. 6, how the combination functions will be described.

Illuminating light emitted from a light source such as a backlight provided on a rear side display plane is collimated to be perpendicular to a display plane of the liquid crystal display apparatus 21. The illuminating light is linearly polarized by a polarizer 22. Since the liquid crystal display apparatus 21 uses a twisted nematic liquid crystal having a positive dielectric anisotropy, the illuminating light incident on the liquid crystal display apparatus 21 is kept polarized perpendicular to the display plane while passing through pixel electrodes applied with a voltage, and the plane of polarization is rotated by 90° when passing through pixel electrodes applied with no voltage. A polarizer 23 is provided between the liquid crystal display apparatus 21 and the optical transmittance adjusting device 20. The polarizer 23 has a polarization direction C which is perpendicular to a polarization direction B of the polarizer 22. The illuminating light which has passed through the pixel electrodes applied with a voltage is shielded by the polarizer 23, forming a black area in an obtained image; and the illuminating light which has passed through the pixel electrodes applied with no voltage is transmitted through the polarizer 23, forming a white area in the obtained image.

The optical transmittance adjusting device 20 includes a black guest-host liquid crystal having a positive dielectric anisotropy and alignment films treated to have an alignment direction D parallel to the polarization direction C of the polarizer 23. The illuminating light which has passed through the polarizer 23 is incident on the optical transmittance adjusting device 20. Where an area of the photoconductor on which a large amount of light is incident, the liquid crystal is applied with a voltage due to a low resistance thereof. As a result, the alignment of the liquid crystal is changed, thereby transmitting the light. In contrast, where an area of the photoconductor on which a small amount of light is incident, the liquid crystal is applied with no voltage. As a result, the alignment of the liquid crystal is kept the same, thereby shielding the light. The contrast ratio of the image is thus increased.

According to the measured results, the contrast ratio of an image obtained through the liquid crystal display apparatus 21 was approximately 5 when not being combined with the optical transmittance adjusting device 20, but was approximately 25 when being combined with the optical transmittance adjusting device 20.

An optical transmittance adjusting device according to the present invention may also be applied to active matrix liquid crystal displays such as thin film transistors and thin film diodes, and to plasma displays, EL displays, LED displays, CRTs and the like, as well as to the 1/50-duty simple matrix liquid crystal display apparatus.

(Projection liquid crystal display apparatus)

A projection liquid crystal display apparatus is a focus of attention today in the field of high definition TV and the like due to the ability of large-plane display. The projection liquid crystal display apparatus, which is generally of a transmission type, is desirably as compact as possible. A compact liquid crystal display apparatus has a problem of a small pixel area, which leads to a low ratio of a total area of pixels with respect to an area of display. This results in a dark image. A reflection liquid crystal display apparatus has an advantage of a large pixel area, which leads to a high value of the above ratio. This results in a bright image. In the reflection liquid crystal display apparatus, however, the contrast ratio of the obtained image is decreased due to light reflection on the glass surface thereof and the like. For this reason, a projection liquid crystal display apparatus of a reflection type has not been put into practice yet.

By combining an optical transmittance adjusting device according to the present invention with a projection liquid crystal display apparatus of a reflection type, the problem of the low contrast ratio can be solved, and thus practical use of such an apparatus can be realized. Needless to say, an optical transmittance adjusting device according to the present invention also advantageously contributes to an increased contrast ratio of an obtained image when being combined with a projection liquid crystal display apparatus of a transmission type.

Figure 7:
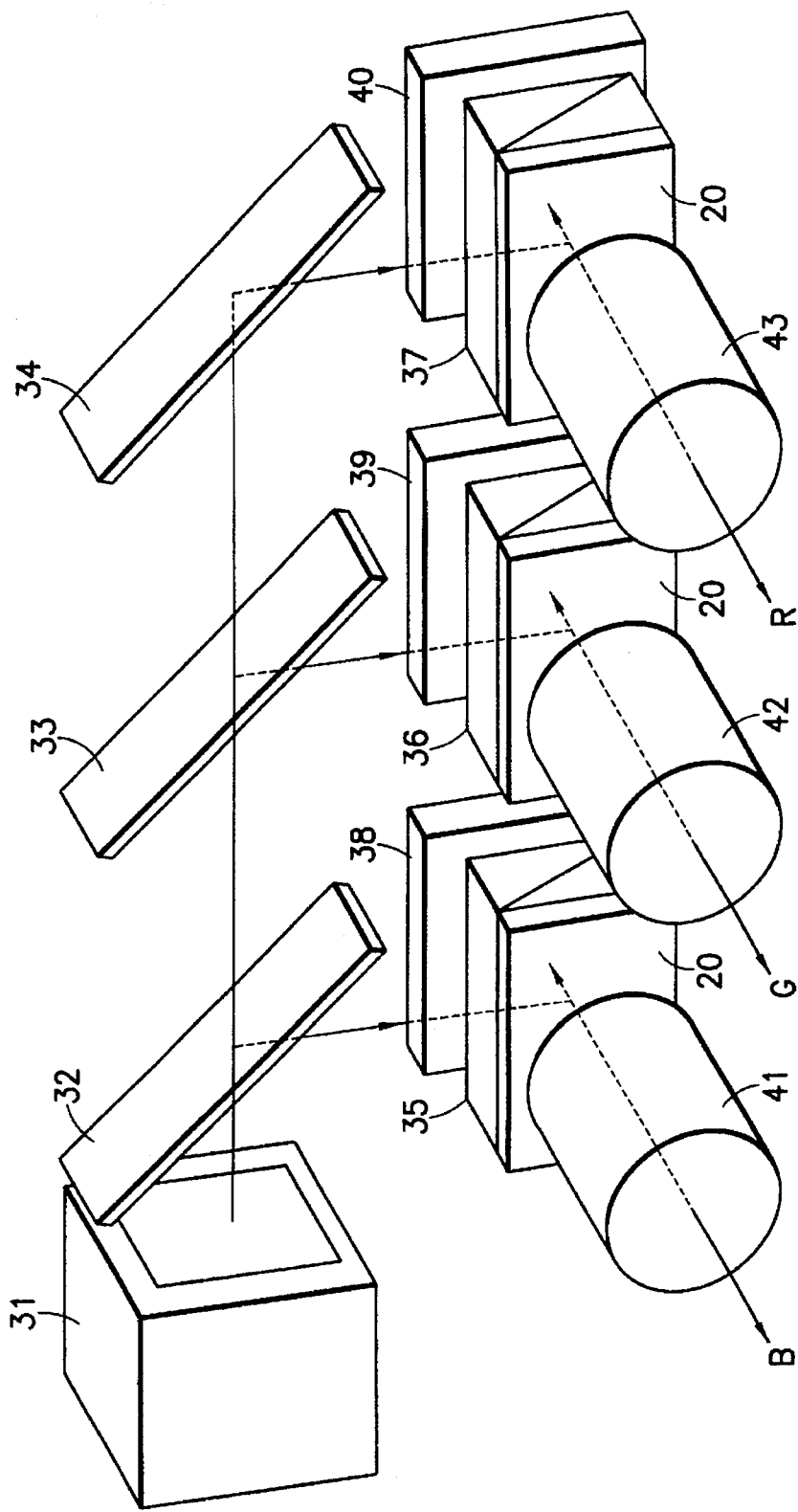
FIG. 7 is a conceptual view of an example of an optical transmittance adjusting device according to the present invention combined with a projection liquid crystal display apparatus.

A projection liquid crystal display apparatus of a reflection type combined with an optical transmittance adjusting device using a twisted nematic liquid crystal according to the present invention will be described with reference to FIG. 7.

Illuminating light emitted from a light source 31 is divided into three color components of blue, green and red by three dichroic mirrors 32, 33 and 34. The light components are linearly polarized by prism beam splitters 35, 36 and 37 and then incident on the reflection liquid crystal display apparatuses 38, 39 and 40. In the liquid crystal display apparatuses 38, 39 and 40, pixels are applied with a voltage in correspondence with image data, thereby changing the alignment of the liquid crystal. The plane of polarization of the light components is rotated in accordance with the change in the above alignment, thereby controlling amounts of the light components transmitted through the prism beam splitters 35, 36 and 37. A display image is thus obtained. By providing optical transmittance adjusting devices 20 between the prism beam splitters 35, 36, 37 and projection lenses 41, 42, 43, the contrast ratio of the obtained image is increased. According to the measured results, the contrast ratio of the image was 15 when the optical transmittance adjusting devices 20 were not used, but was 75 when the optical transmittance adjusting devices 20 were used, thus realizing a clear image.

Figure 8:
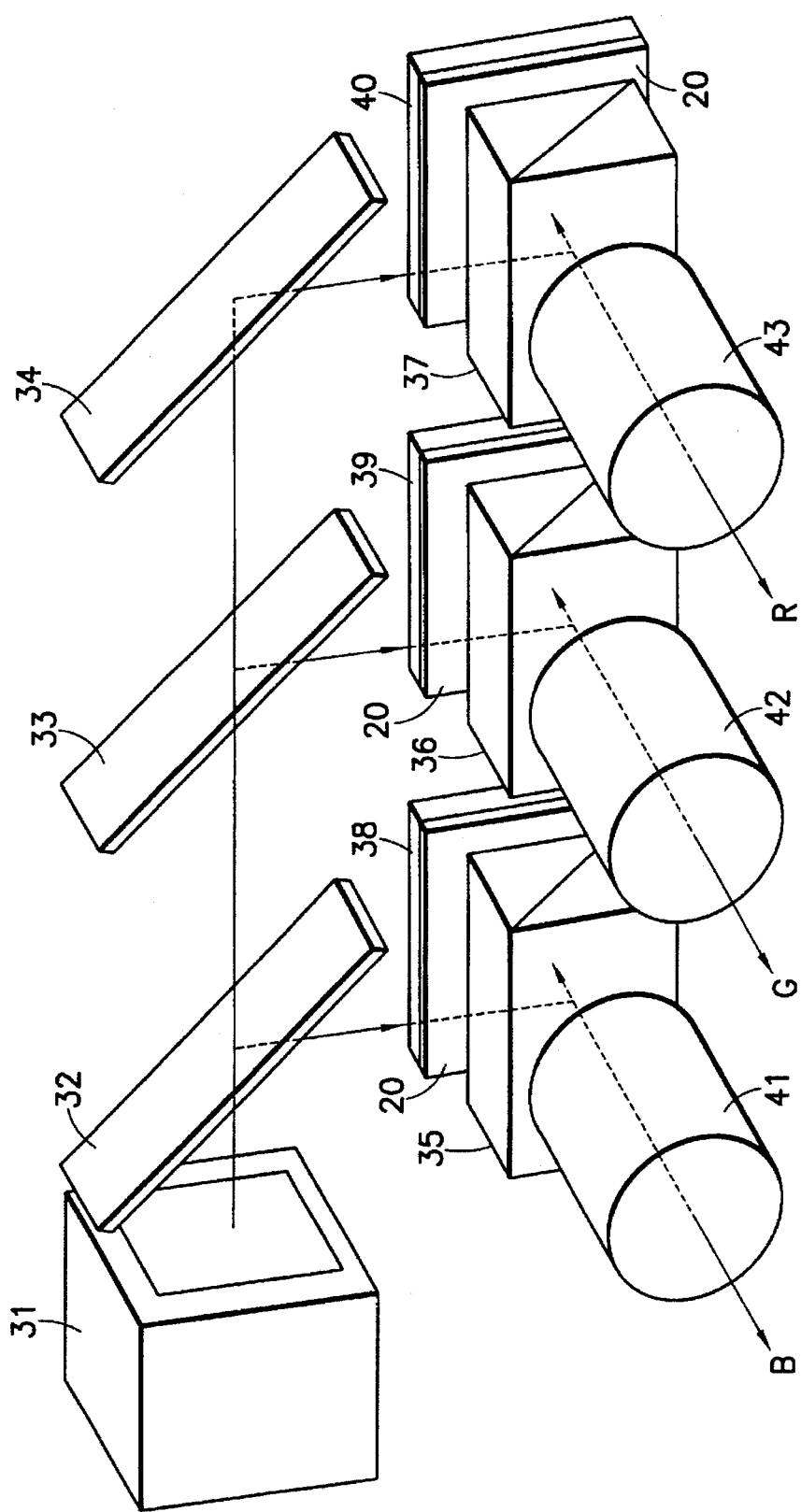
FIG. 8 is a conceptual view of another example of an optical transmittance adjusting device according to the present invention combined with a projection liquid crystal display apparatus.
Figure 9:
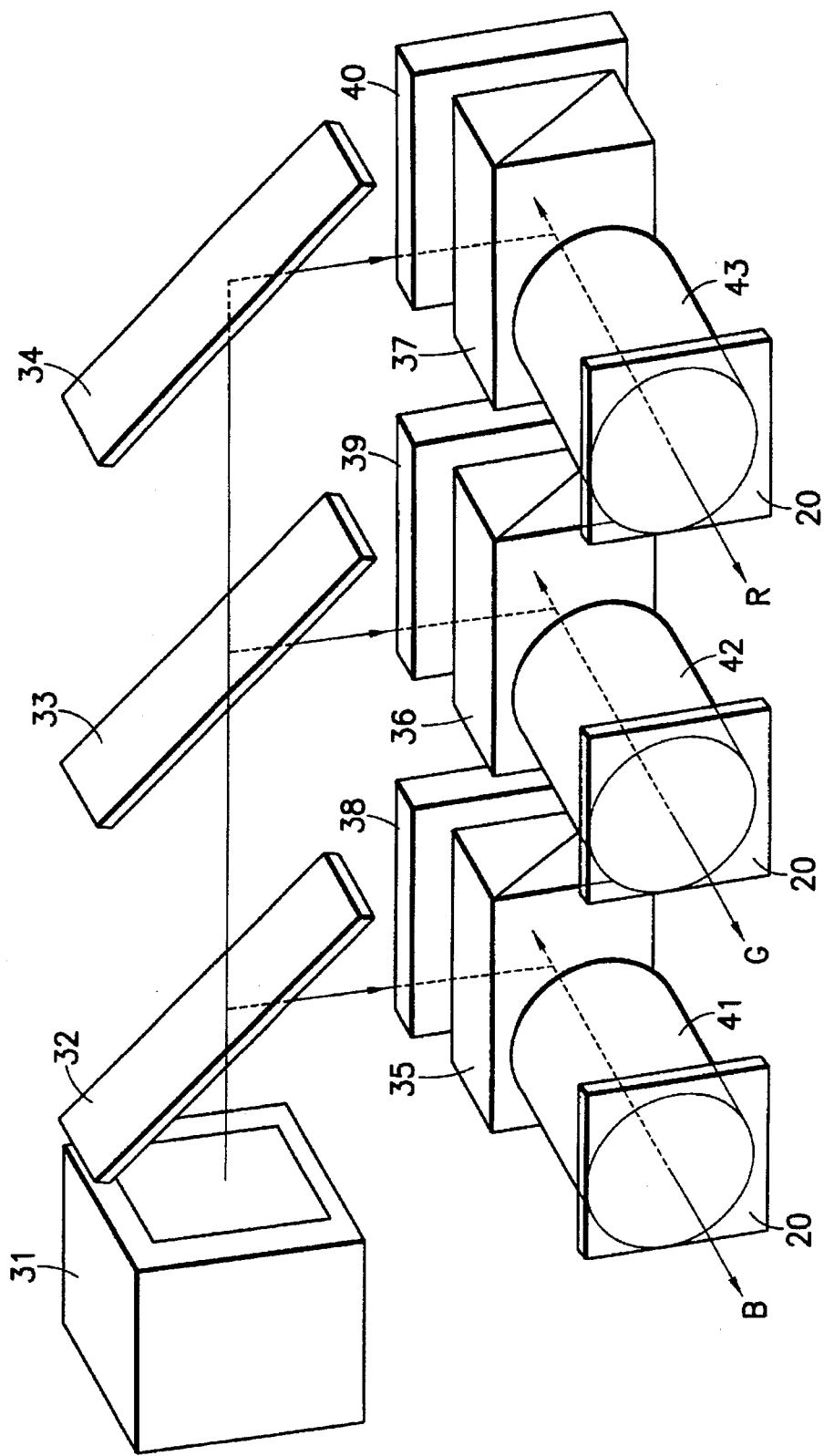
FIG. 9 is a conceptual view of still another example of an optical transmittance adjusting device according to the present invention combined with a projection liquid crystal display apparatus.

The optical transmittance adjusting devices 20 may be provided at other positions than between the prism beam splitters 35, 36, 37 and the projection lenses 41, 42, 43, as far as the contrast ratio of the image can be controlled. For example, the optical transmittance adjusting devices 20 may be provided, for example, between the prism beam splitters 35, 36, 37 and the liquid crystal display apparatuses 38, 39 and 40 as is shown in FIG. 8, or in front of the projection lenses 41, 42 and 43 as is shown in FIG. 9.

(Color plate making apparatus)

In a color plate making apparatus, it is essential to obtain a clear reproduction of an original image. When the contrast ratio of the original image is too low, there is no conventional method for increasing the contrast ratio other than using an image processing technology. The use of the image processing technology usually requires a high cost due to the use of a computer and a specialized knowledge for computer operation.

Figure 10:
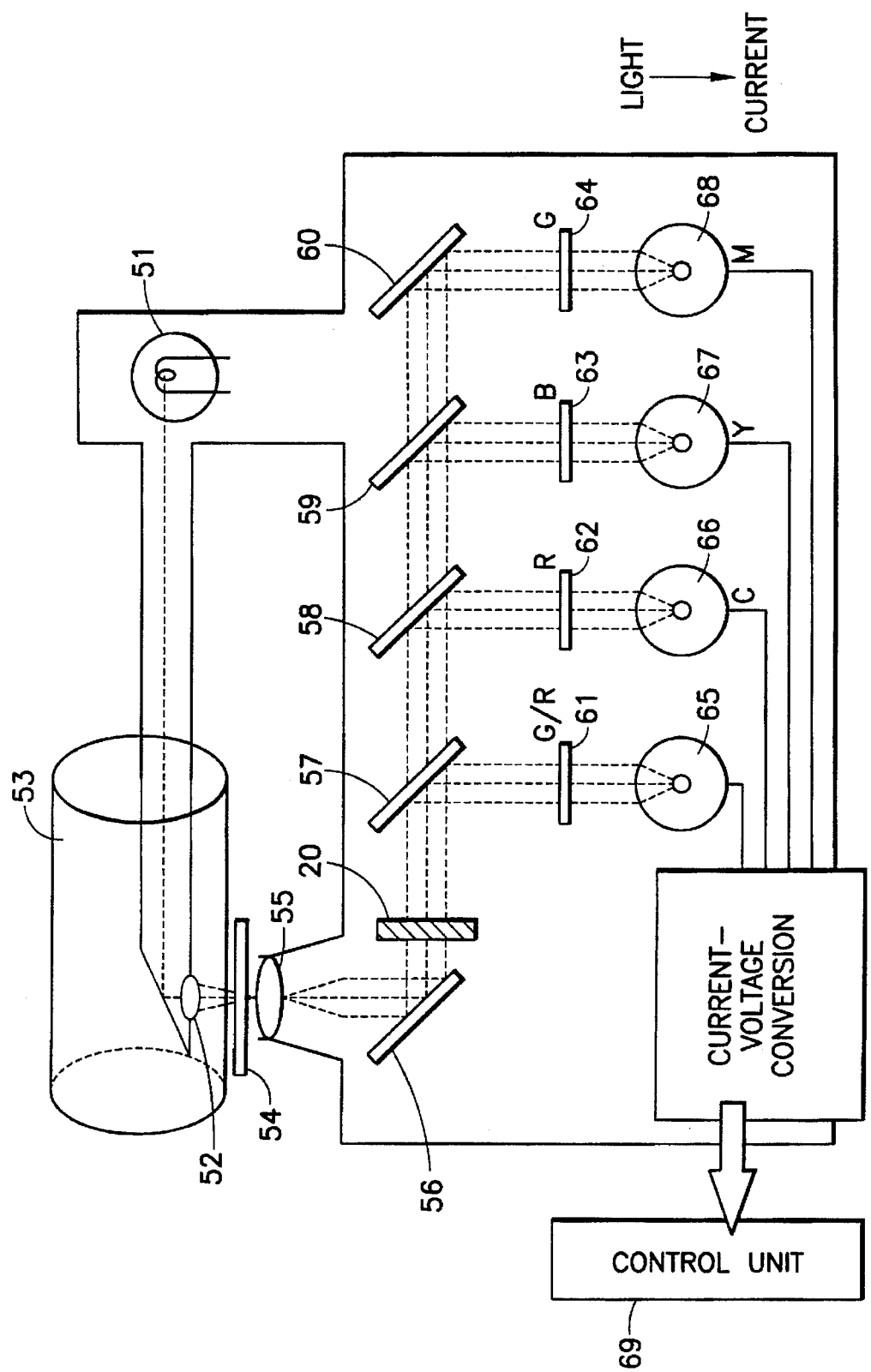
FIG. 10 is a conceptual view of an example of an optical transmittance adjusting device according to the present invention incorporated into a color plate making apparatus.

By incorporating an optical transmittance adjusting device according to the present invention into a color plate making apparatus which has no contrast ratio adjusting function by use of the image processing technology or the like, an easy and low-cost contrast ratio adjustment is realized. FIG. 10 shows a color plate making apparatus incorporating an optical transmittance adjusting device according to the present invention. With reference to FIG. 10, how the color plate making apparatus functions will be described.

White light emitted from a halogen lamp 51 as a light source is converged by a convergence lens 52 and reads an image of a document 54 attached to a document cylinder 53. Then, the white light is divided into three light components of red, blue and green by a pick-up lens 55, a mirror 56, a half mirror 57, dichroic mirrors 58 and 59, another mirror 60, and color filters 61 through 64. The three light components are then converted into electric signals by phototubes 65 through 68 and sent to a control unit 69 as plate making data. By providing an optical transmittance adjusting device 20 according to the present invention between the mirror 56 and the half mirror 57, the contrast ratio of an image to be formed can be adjusted before the light is divided into three light components.

By experiments, it was confirmed that even from a low-contrast ratio image, a clear image which is easy to see can be obtained. Such an effect was especially conspicuous for photographs and the like.

Figure 11:
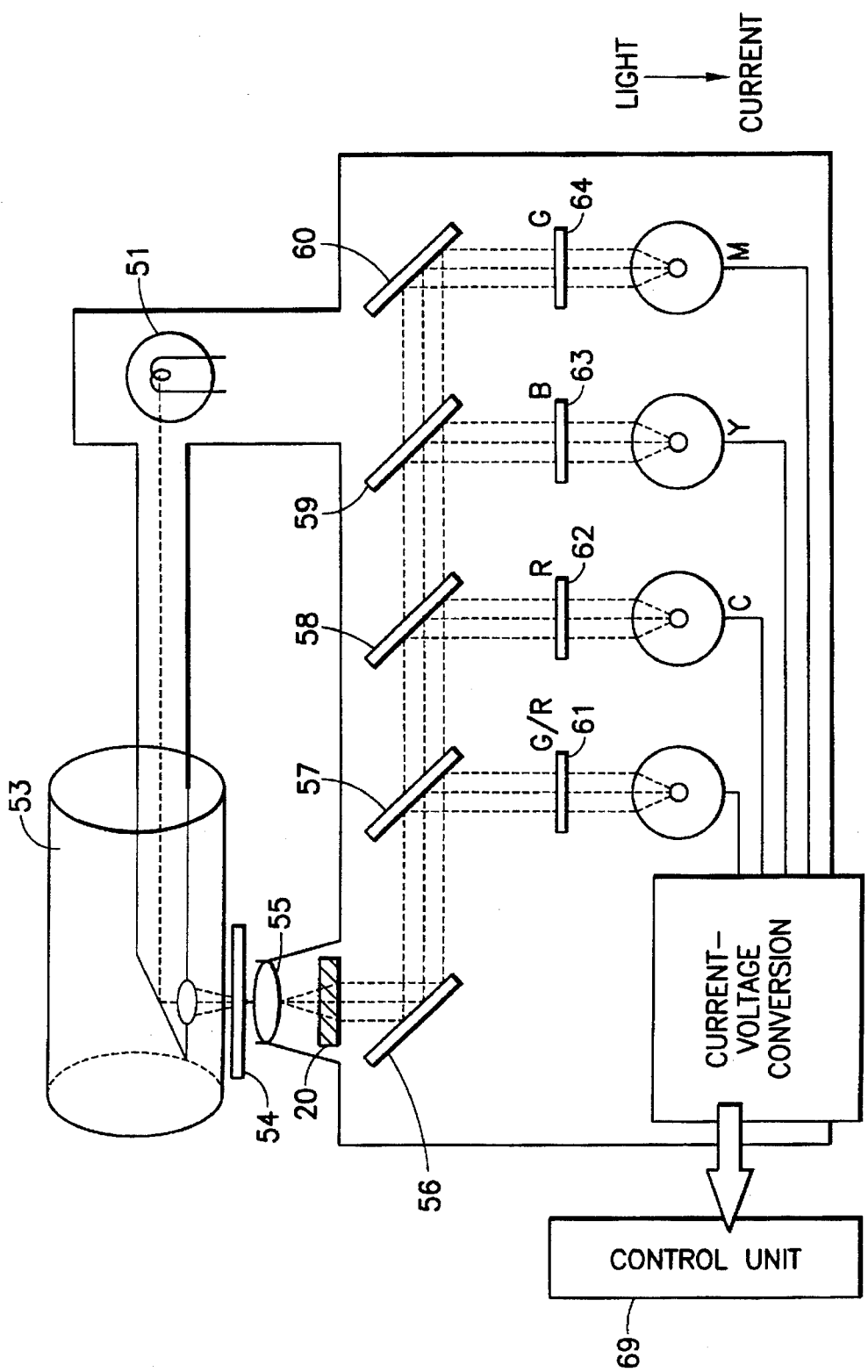
FIG. 11 is a conceptual view of another example of an optical transmittance adjusting device according to the present invention incorporated into a color plate making apparatus.
Figure 12:
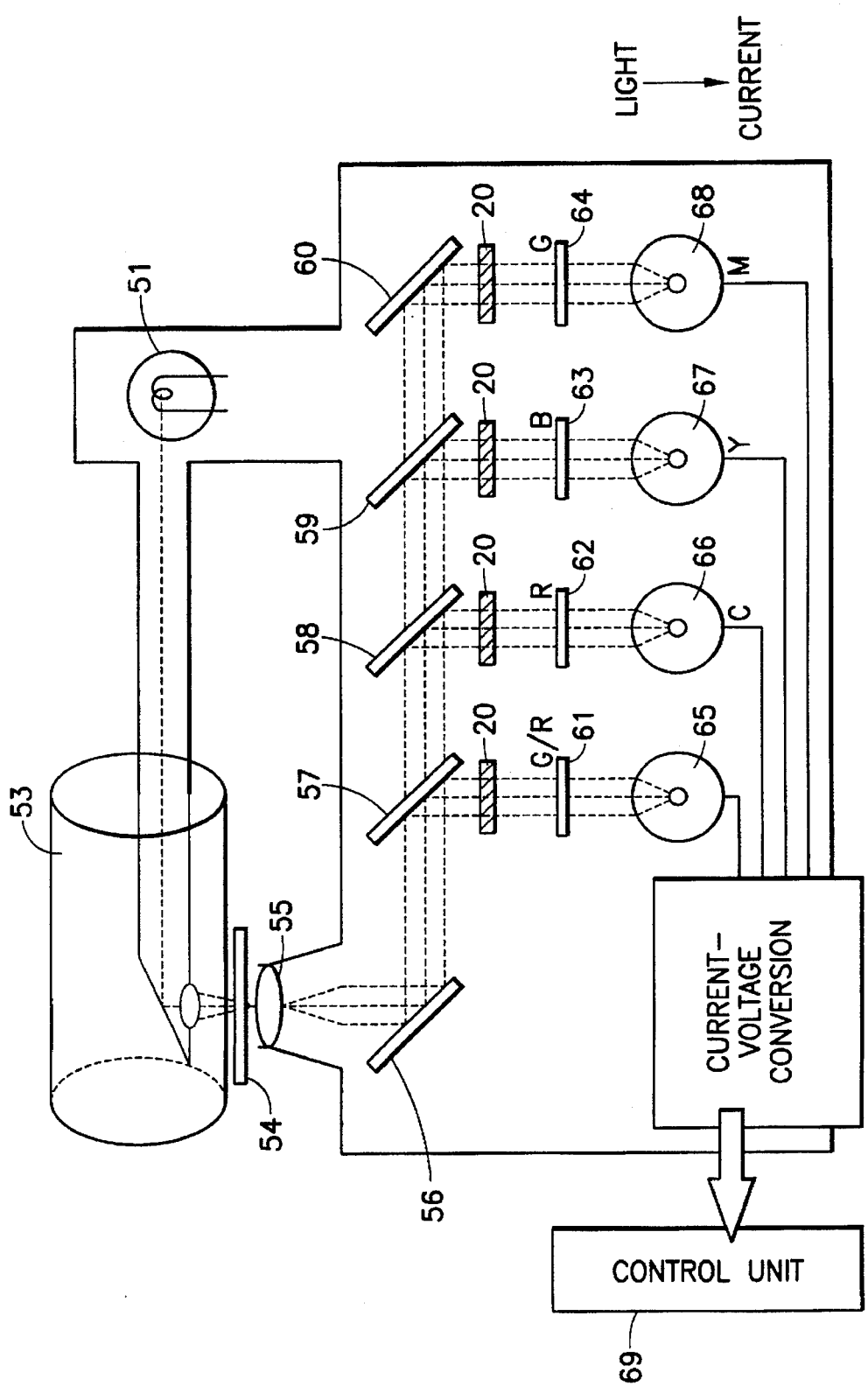
FIG. 12 is a conceptual view of still another example of an optical transmittance adjusting device according to the present invention incorporated into a color plate making apparatus.
Figure 13:
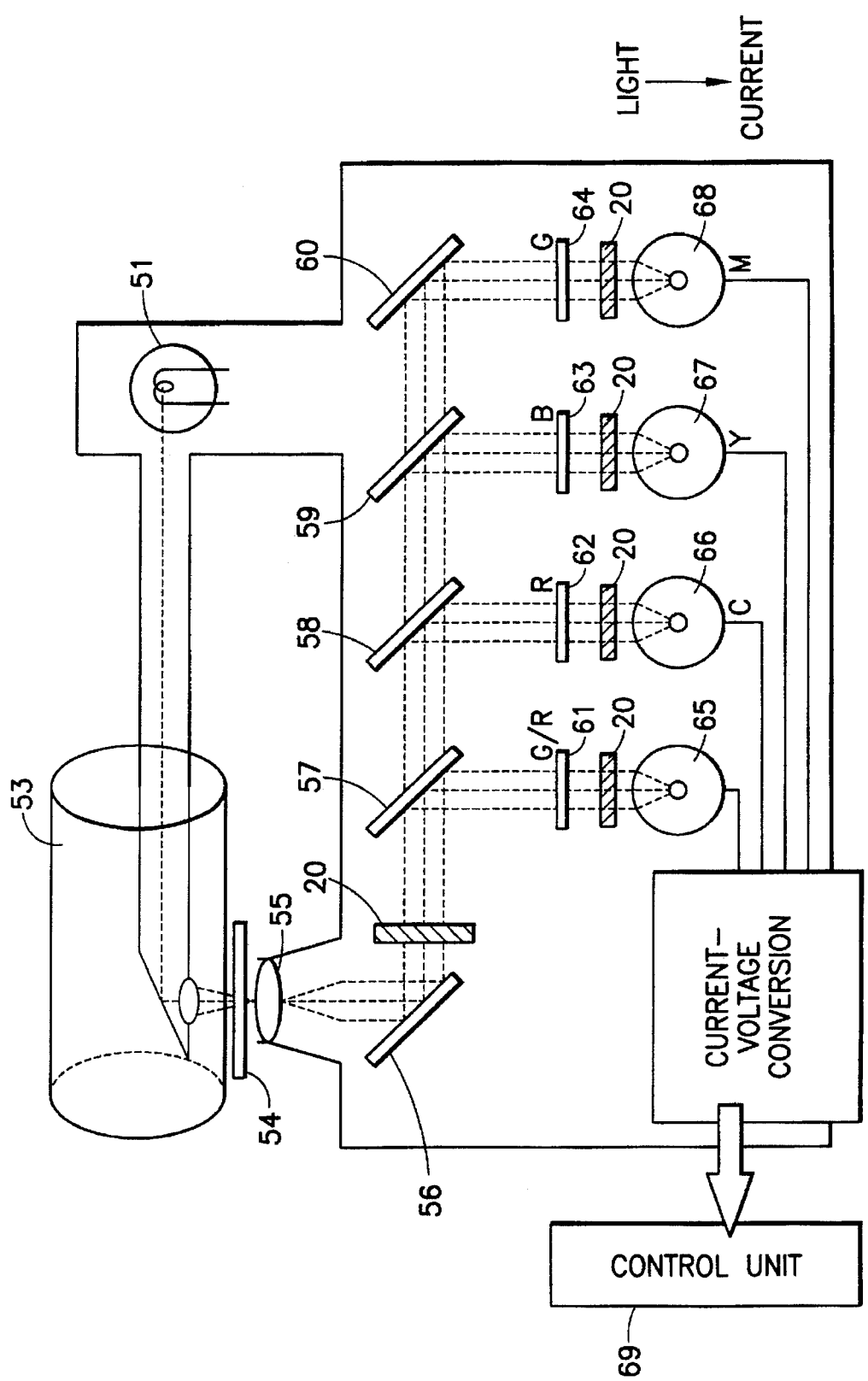
FIG. 13 is a conceptual view of still another example of an optical transmittance adjusting device according to the present invention incorporated into a color plate making apparatus.

The optical transmittance adjusting device 20 may also be provided at other positions than between the mirror 56 and the half mirror 57 as far as the contrast ratio of the image can be increased. For example, the optical transmittance adjusting device 20 may be provided between the pick-up lens 55 and the mirror 56 as is shown in FIG. 11. In the case when the optical transmittance adjusting devices 20 are provided in a desired number between the half mirror 57, dichroic mirrors 58, 59, the mirror 60 and the color filters 61 through 64 as is shown in FIG. 12, or between the color filters 61 through 64 and the phototubes 65 through 68 as is shown in FIG. 13, the contrast ratio can be adjusted for each color of red, blue and green, and the like. Therefore, colors according to the image of an original document can be reproduced.

(Color copying apparatus)

Figure 14:
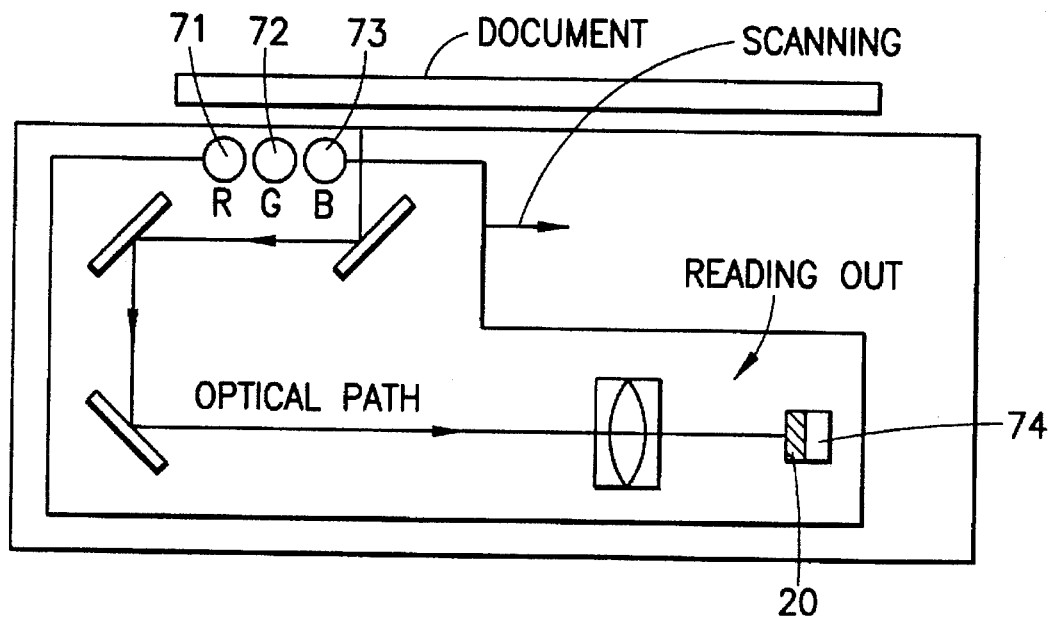
FIG. 14 is a conceptual view of an example of an optical transmittance adjusting device according to the present invention incorporated into a color copying apparatus.

In a color copying apparatus, a half tone is difficult to reproduce when the contrast ratio of an image is high. An image having a half tone area such as a photograph is often reproduced into an image having an excessively high contrast ratio. When the contrast ratio is low, an unclear image is obtained with black points and the like caused by noise. Accordingly, it is essential to adjust the contrast ratio to be optimum. FIG. 14 shows a color copying apparatus incorporating an optical transmittance adjusting device according to the present invention.

There are three main methods for reading a color image. In a first method, light from a white light source is divided into three light components of red, green and blue by color filters. In a second method, illuminating lamps for emitting light components having wavelengths of the three colors are provided. In a third method, color filters are attached on a surface of a CCD. In FIG. 14, illuminating lamps 71 through 73 for each of the three colors are provided. Light components of red, green and blue are sequentially emitted, and reflected light components thereof are sequentially read by a CCD 74. By incorporating an optical transmittance adjusting device 20 on a surface of the CCD 74, the contrast ratio of an obtained image is adjusted for each color. With such an effect, it is possible to put importance on reproducibility of each color when adjusting the contrast ratio, and also to intentionally change the colors of the original image.

In order to raise the contrast ratio to obtain a clear image in a color copying apparatus, a liquid crystal having a positive dielectric anisotropy is utilized in the optical transmittance adjusting device. A liquid crystal having a negative dielectric anisotropy may also be utilized in a color copying apparatus, in which case, a half-tone image can be obtained. Which type of liquid crystal should be used is determined in accordance with the quality of an original image to be copied.

(Color facsimile apparatus)

In a facsimile apparatus, an image having a low contrast ratio is often reproduced into an unclear image due to noise.

Figure 15:
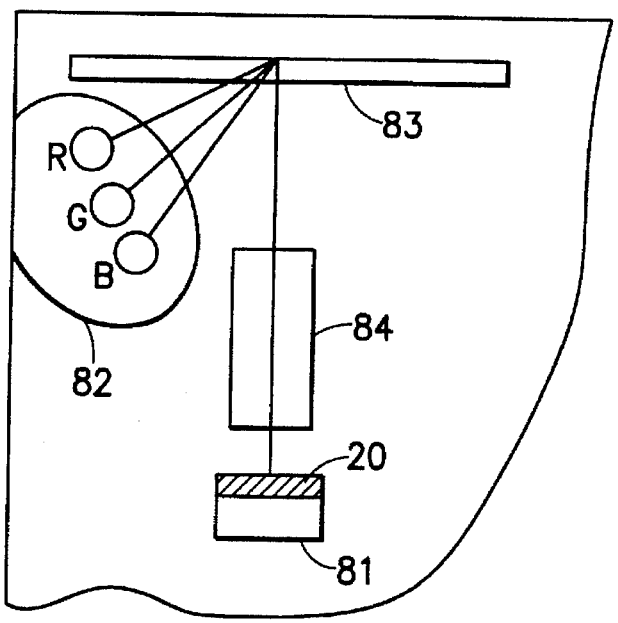
FIG. 15 is a conceptual view of an example of an optical transmittance adjusting device according to the present invention incorporated into a color facsimile apparatus.

It is necessary to adjust the contrast ratio of the image before sending the image in order to generate signals which are easily received. In a color facsimile apparatus, contrast ratio adjustment is especially difficult since light having image data is divided into three light components. Accordingly, it is extremely difficult to send a clear image. FIG. 15 shows a color facsimile apparatus incorporating an optical transmittance adjusting device 20 according to the present invention.

Light components of red, green and blue are sequentially emitted from a light source 82, and the light components reflected on a document 83 are sequentially read by a CCD 81 as a sensor through a lens 84. By attaching the optical transmittance adjusting device 20 on a surface of the CCD 81, it is possible to convert image data for each color into signals having appropriate levels. Accordingly, a clear image can be sent.

The optical transmittance adjusting device 20 may also be provided at other positions than on a surface of the CCD 81 as far as the contrast ratio can be adjusted. For example, the optical transmittance adjusting device 20 may be provided between the document 83 and the lens 84.

Hereinafter, practical examples of an optical transmittance adjusting device which includes a liquid crystal having a negative dielectric anisotropy will be described.

In an optical apparatus such as a camera or an imaging apparatus such as a video camera, an amount of incident light is partially large, and the corresponding area of an obtained image is white. It is required to perform backlight compensation, but the compensation processing has problems as mentioned before.

By incorporating an optical transmittance adjusting device into such an apparatus, the contrast ratio can be adjusted as follows. Where an area receiving an excessively large amount of incident light, such as an area receiving backlight, a small amount of light is transmitted. The light is transmitted as it is through other areas. Accordingly, no white area is made in a CCD plane, a photosensitive film, or the like. Since the adjustment is automatically performed, special skill or experiment is not necessary. As is apparent from this, problems conventionally inherent in automatic backlight compensation in a camera or a video camera can be solved.

As an experiment, an optical transmittance adjusting device according to the present invention was attached on a surface of a CCD of a video camera. It was confirmed that an excessive amount of light is shielded only in an area of an image receiving the backlight to obtain a natural-looking image. The adjustment is performed at a constant level independently of the size or the position of the area receiving the backlight. As a result, the brightness of an image is not entirely changed depending on whether a backlight area exists or not, as it is in a conventional apparatus. The problem of imperfect adjustment caused by the size of the backlight area is solved. The optical transmittance adjusting device can follow a rapid change of the amount of the light due to a high response thereof.

The optical transmittance adjusting device may be provided between a camera and a film, in a lens system, or the like in the case of a camera, and between a lens and a CCD, in a lens system, or the like in the case of a video camera. In other words, the optical transmittance adjusting device may be provided at any position appropriate for contrast ratio adjustment.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A contrast ratio adjusting device, comprising:
   a liquid crystal; and
   a first substrate and a second substrate interposing the liquid crystal therebetween,
   wherein
   the first substrate includes a first transparent electrode adjacent to the liquid crystal, and
   the second substrate includes a matrix of second transparent electrodes, each of which is connected to a respective transparent photoconductor, an area occupied by each photoconductor being smaller than that of its connected second transparent electrode, the second transparent electrodes and the transparent photoconductors being on the liquid crystal side of the second substrate, the first electrode and the second electrodes being supplied with an AC voltage.

2. A contrast ratio adjusting device according to claim 1, wherein the liquid crystal is formed of a material having a positive dielectric anisotropy.

3. A contrast ratio adjusting device according to claim 1, wherein the liquid crystal is formed of a material having a negative dielectric anisotropy.

4. A display apparatus comprising:
   a display device, and
   a contrast ratio adjusting means comprising a contrast ratio adjusting plane divided into a plurality of areas, and
   adjusting means for detecting an amount of light incident on each of the areas and adjusting a contrast ratio by varying an optical transmittance separately for each of the areas, based on the detected amount of light incident on each of the areas,
   wherein the adjusting means comprises a respective photoconductor for detecting the amount of light incident on each of the areas, an area occupied by each photoconductor being smaller than that of its respective area of said plane.

5. A display apparatus according to claim 4, further comprising a pair of polarizers sandwiching the display device therebetween.

6. A color plate making apparatus comprising:
   a light source for emitting light to an object;
   a light dividing means for dividing light, reflected from the object, into a plurality of color components;
   a plate making data forming means for converting the plurality of color components into plate making data to be controlled; and
   a contrast ratio adjusting means provided between the document and the plate making data forming means, the contrast ratio adjusting means comprising a contrast ratio adjusting plane divided into a plurality of areas, and adjusting means for detecting an amount of light incident on each of the areas and adjusting a contrast ratio by varying an optical transmittance separately for each of the areas, based on the detected amount of light incident on each of the areas,
   wherein the adjusting means comprises a respective photoconductor for detecting the amount of light incident on each of the areas, an area occupied by each photoconductor being smaller than that of its respective area of said plane.

7. A color plate making apparatus according to claim 6, wherein the contrast ratio adjusting means is provided between the document and the light dividing means.

8. A color plate making apparatus according to claim 6, wherein the contrast ratio adjusting means is provided between the light dividing means and the plate making data forming means.

9. A color copying apparatus comprising:

a color component making means for making a plurality of color components in accordance with an image of a document;

an image reproducing means for reproducing an image based on the plurality of color components; and a contrast ratio adjusting means provided between the document and the image reproducing means, the contrast ratio adjusting means comprising a contrast ratio adjusting plane divided into a plurality of areas, and adjusting means for detecting an amount of light incident on each of the areas and adjusting a contrast ratio by varying an optical transmittance separately for each of the areas based on the detected amount of light incident on each of the areas, wherein the adjusting means comprises a respective photoconductor for detecting the amount of light incident on each of the areas, an area occupied by each photoconductor being smaller than that of its respective area of said plane.

10. A color facsimile apparatus comprising:

a sensor means for reading an image of a document as a plurality of color components; and a contrast ratio adjusting means provided between the document and the sensor means, the contrast ratio adjusting means comprising a contrast ratio adjusting plane divided into a plurality of areas, and adjusting means for detecting an amount of light incident on each of the areas and adjusting a contrast ratio by varying an optical transmittance separately for each of the areas based on the detected amount of light incident on each of the areas, wherein the adjusting means comprises a respective photoconductor for detecting the amount of light incident on each of the areas, an area occupied by each photoconductor being smaller than that of its respective area of said plane.

11. A contrast adjusting device comprising:

first and second substrates facing each other;

a transparent uniform electrode formed on the first substrate;

a plurality of pixel electrodes formed in rows and in columns along source electrodes on the second substrate, each of the pixel electrodes overlapping a corresponding one of the source electrodes;

a plurality of photoconductors for electrically connecting the pixel electrodes to the respective source electrodes, each of the photoconductors being disposed in a region where a corresponding one of the pixel electrodes overlaps a corresponding one of the source electrodes; and an adjusting layer interposed between the pixel electrodes and the uniform electrode, the adjusting layer having variable optical transmittance which is varied in accordance with a voltage applied between the pixel electrodes and the uniform electrode, wherein light enters and travels across the second substrate toward the plurality of photoconductors.

12. A contrast adjusting device according to claim 11, wherein the photoconductors have a narrower width than that of the source electrodes.

13. A contrast adjusting device according to claim 11, wherein the adjusting layer includes a liquid crystal material having a positive dielectric anisotropy.

14. A contrast adjusting device according to claim 11, wherein the adjusting layer includes a liquid crystal material having a negative dielectric anisotropy.

* * * * *